(12) United States Patent
Buddhikot et al.

(10) Patent No.: US 6,999,988 B2
(45) Date of Patent: Feb. 14, 2006

(54) METHOD AND SYSTEM FOR DATA LAYOUT AND REPLACEMENT IN DISTRIBUTED STREAMING CACHES ON THE INTERNET

(75) Inventors: Milind M. Buddhikot, Cliffwood, NJ (US); Katherine H. Guo, Eatontown, NJ (US); Subhash Suri, Santa Barbara, CA (US); Youngsu Chae, Norcross, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 833 days.

(21) Appl. No.: 09/823,777

(22) Filed: Mar. 30, 2001

(65) Prior Publication Data

US 2002/0007392 A1 Jan. 17, 2002

Related U.S. Application Data

(60) Provisional application No. 60/217,921, filed on Jul. 13, 2000.

(51) Int. Cl.
*G06F 15/16* (2006.01)
*G06F 15/167* (2006.01)
*G06F 3/00* (2006.01)

(52) U.S. Cl. ............ 709/203; 709/212; 709/213; 709/214; 709/216; 709/217; 719/312

(58) Field of Classification Search ........ 709/223, 709/219, 203, 213
See application file for complete search history.

(56) References Cited

U.S. PATENT DOCUMENTS 6,438,652 B1 * 8/2002 Jordan et al. .............. 711/120

* cited by examiner

*Primary Examiner*—Bharat Barot
*Assistant Examiner*—B R Bruckart

(57) ABSTRACT

A cache replacement system and method for changing the number of cached copies of segments of a media clip in response to rank change for the media clip is disclosed. Whenever rank change for a media clip is detected at an origin server, rank change information is distributed to proxy servers organized in a loosely coupled distributed cache. Each proxy server uses this information to recompute caching probabilities for segments of the media clip in order to determine which segments of the clip to store or discard, thereby forming a new cache layout for the clip at each proxy server. Segments are neither added nor deleted to build the new cache layout until client requests for segments of the clip are received at proxy servers. Upon receiving client requests, construction of the new cache layout occurs on a segment-by-segment basis by employing techniques of lazy caching and token exchange.

10 Claims, 3 Drawing Sheets

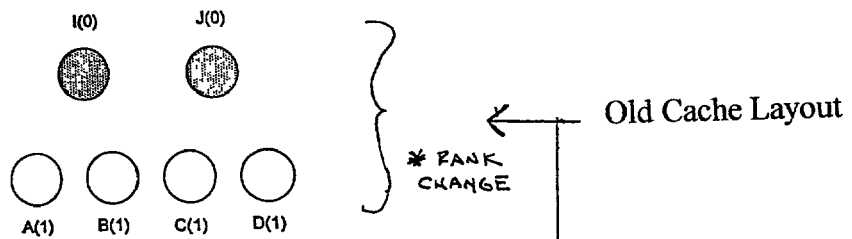
FIG. 2a ← Old Cache Layout
* RANK CHANGE
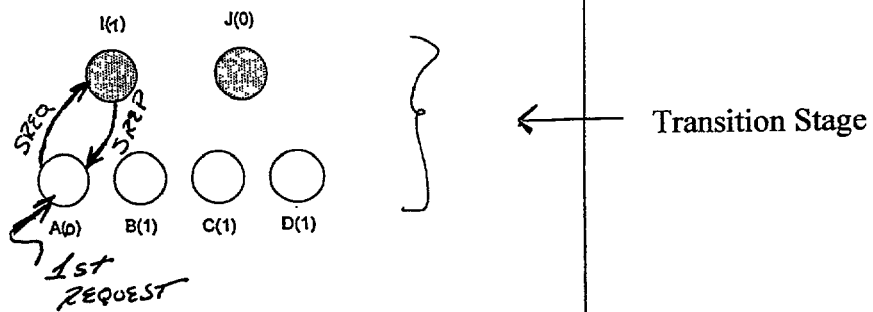
FIG. 2b ← Transition Stage
1st REQUEST
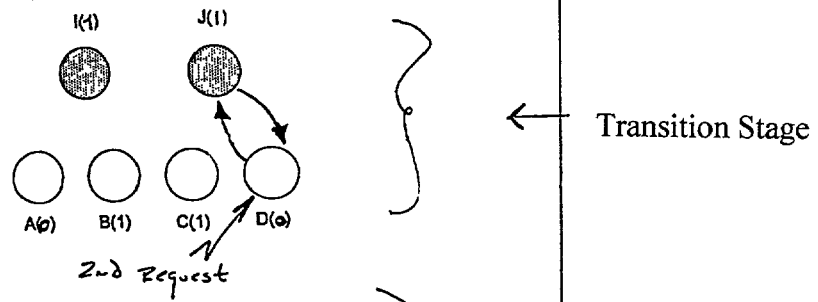
FIG. 2c ← Transition Stage
2nd Request
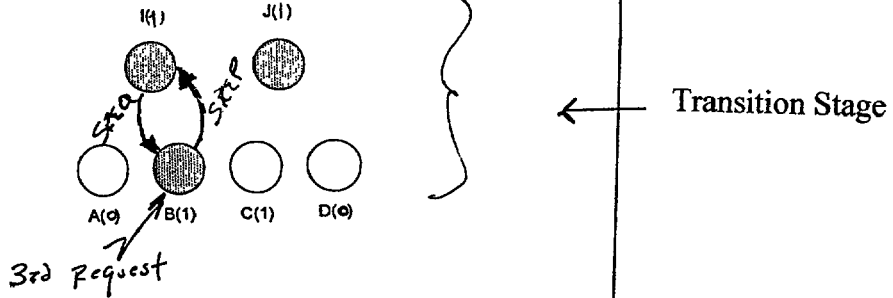
FIG. 2d ← Transition Stage
3rd Request
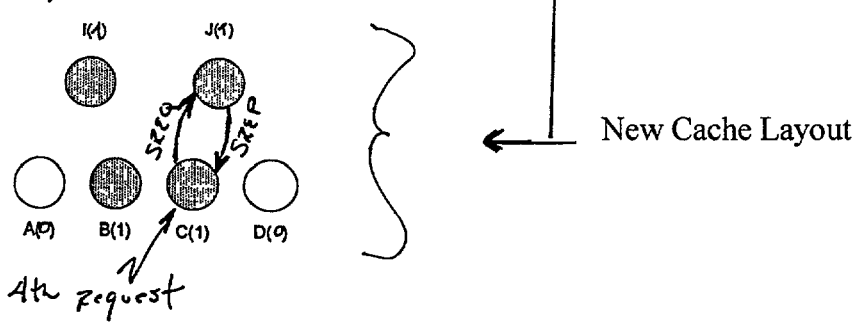
FIG. 2e ← New Cache Layout
4th Request

METHOD AND SYSTEM FOR DATA LAYOUT AND REPLACEMENT IN DISTRIBUTED STREAMING CACHES ON THE INTERNET The present application claims priority to a United States Provisional Application filed on Jul. 13, 2000 by Buddhikot et al. having U.S. Provisional Application No. 60/217,921; the contents of which are incorporated herein by reference.

BACKGROUND OF THE INVENTION

1. Field of the Invention

The present invention relates to network systems, and particularly to public network systems, such as the Internet. More particularly, the invention relates to methods which improve the caching of streaming multimedia data (e.g., audio and video data) from a content provider over a network to a client's computer.

2. Description of the Related Art

Generally, in a caching architectural system, the popularity rank of a media clip at an origin server is dynamically changed as the media clients' preference changes over time. As the popularity rank of a media clip changes, this change is reflected in a change in the number of cached copies of segments stored among a plurality of network distributed proxy servers (NDPS) in the network. For example, when a media clip's popularity rank rises or increases, the number of cached segments in the distribution set increases. Each NDPS maintains a local hit count for each media clip and periodically reports the local hit count to the origin server. The local hit count is a measure of a local preference or popularity of the media clip. The origin server combines the local hit counts received from each proxy and determines whether the popularity rank of a media clip has changed. If the origin server determines that the rank of a media clip has changed, the change should be reflected throughout the network by changing the data layout. If the media clip has not been distributed, a popularity rank change is easily made at the origin server. Upon distributing the media clip from the origin server, the distribution carries the up-to-date rank information. Specifically, the NDPSs use the updated rank information to calculate revised segment caching probabilities. That is, each proxy re-computes the caching probabilities to determine whether or not to cache each segment.

In the case where a media clip has already been distributed and stored at the NDPSs, adjusting rank information at the origin server is inadequate. In this case, the data layout throughout the network (i.e., at each NDPS) must be modified according to the new rank information. If the popularity rank of a media clip goes up, the number of cached segments should be increased in the network. In the same manner, if the popularity rank of the clip goes down, the number of cached segments should be decreased.

One simple method to deal with rank changes is to redistribute the entire clip and rebuild a new data layout. Upon redistributing the clip from the origin server, each proxy clears the current data layout of the clip and builds a new data layout based on the new rank information. There are however, drawbacks associated with the simple redistribution method. One drawback is that the origin server has to redistribute the entire clip whenever the rank of the clip is changed. This generates a considerable amount of network traffic and origin server load. Another drawback concerns the cache map inconsistency problem. As previously stated, each proxy clears the current cache layout for the clip and builds a new cache layout. Thus, it takes time for each proxy to build a new cache layout and to converge to a new consistent cache map for the clip. While the new cache layout is being built and settling, there is an unavoidable window of time during which the origin server cache map is inconsistent or incomplete. This inconsistency can only be addressed by re-directing client requests for the clip from the NDPSs to the origin server until the new cache map is built and settles. A third drawback is the triggering of numerous Internet cache protocol (ICP) message exchanges. The redistribution of a clip introduces the cache layout changes at the NDPSs at the same time. As a result, the ICP protocol generates numerous message exchanges to build a new cache map that reflects the cache layout changes.

Based on the foregoing, there is a need for a system and method for implementing rank or popularity changes of media clips to be used in association with the present invention which overcomes the problems associated with prior art methods of media clip distribution and redistribution.

SUMMARY OF THE INVENTION

The present invention is directed to a system and method for changing the number of cached copies of segments of a media clip in response to a rank change for the media clip.

According to one aspect of the present invention, whenever a rank change for a media clip is detected at an origin server, the rank change information is distributed to a plurality of proxy servers which collectively make up a loosely coupled distributed cache. Upon receiving the rank change information at each proxy server, the caching probabilities for the segments of the media clip are re-computed using the rank change information to determine which segments of the clip to store or discard, thereby forming a new cache layout for the clip at each proxy server.

A feature of the present invention is that even though each proxy server makes a local determination regarding which segments of the clip to store or discard, segments are neither added or deleted to actually build the new cache layout until such time as client requests for segments of the media clip are received at the proxy servers. That is, the construction of the new cache layout is deferred or postponed until client requests arrive at the proxy servers which initiate the operations of lazy caching and token exchange to construct the new cache layout. It is noted that the construction of the new cache layout occurs on a segment-by-segment basis in accordance with client requests for particular segments of the media clip.

Upon re-computing the caching probabilities at each proxy server in response to a rank change, the determination as to which segments of the clip are stored or discarded is not immediately implemented at the proxy servers, as discussed above, instead, the determinations to store or discard segments of the clip are preserved in tokens. Specifically, for each segment of a media clip, a proxy server will set a token for each segment to "one" in the case where the proxy server decides to store the segment in accordance with the rank change information. Similarly, the proxy server will set the token for each segment to "zero" in the case where the proxy server decides not to store the segment. Upon receiving client requests at the proxy servers the tokens may be exchanged, in certain cases, between proxy servers for requested segments which a proxy server does not store but must service to a client. After some number of successful token exchanges between proxy servers occurs subsequent to a rank change, a new cache layout results.

A primary advantage of the caching method of the present invention include is that segments are not altered in the distributed cache until it is absolutely required to do so in response to client requests thereby significantly reducing ICP message exchanges.

Another advantage of the caching method of the present invention is that it relieves the origin server from having to redistribute the entire clip whenever a rank change occurs.

A still further advantage of the caching method of the present invention is that cache map inconsistency problems are eliminated.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where:

FIGS. 2a–2e illustrate an example of the caching method of the present invention in the case where a media clips' rank change is increased.

DETAILED DESCRIPTION OF THE PREFERRED EMBODIMENTS

Figure 1:
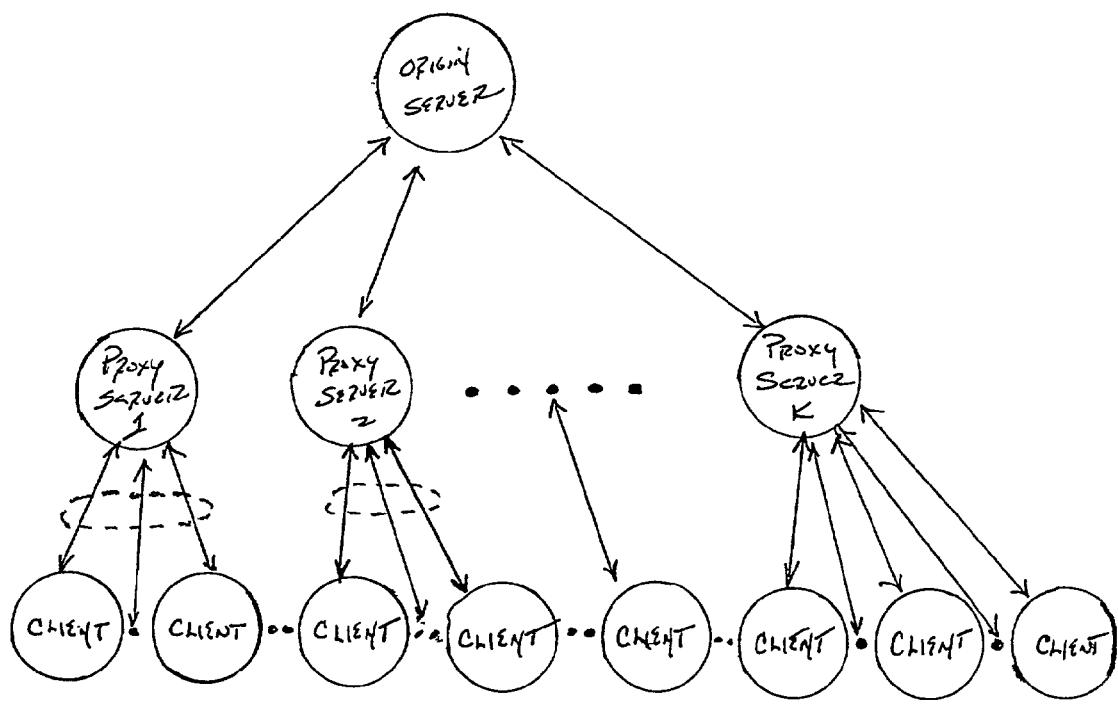
FIG. 1 illustrates a model of a loosely coupled distributed cache in accordance with the present invention.

FIG. 1 describes a basic model of a distributed cache including an origin server which stores thereon a plurality of multimedia clips. The origin server is connected to a plurality of proxy servers in the network. The origin server maintains a media clip database and distributes the media clips to the proxy servers. The origin server also provides streaming services for client requests of segments that are not cached in any of the proxy servers. The origin server is responsible for handling media clip distribution and proxy cache misses. Each proxy server is configured as a designated local proxy for a set of clients and is responsible to provide streaming services to the clients. Each proxy server also supports remote clients on behalf of the designated proxies of the remote clients if the remote proxy servers do not cache the requested segments in their local caches. Each proxy server maintains a local media clip cache. The collection of proxy servers is configured as a larger cooperative distributed streaming cache.

In the caching architecture of the present invention, the rank of a clip is a measure of the clip's popularity. For example, the higher the rank the more popular the clip. In the present embodiment a higher rank is associated with a lower numerical designation. For example, rank 5 is higher than rank 10. As client preferences for a media clip change over time, the rank or popularity of the clip at each proxy server is dynamically changed. Each proxy in the network maintains a local hit count for each media clip and periodically reports the local hit count information to the origin server. If the rank of a media clip changes, the change should be reflected throughout the network by adjusting the cache layout. For example, if the rank of a media clip increases, then the network should reflect this change by storing a greater number of cached segments of the clip. In the same manner, if the rank of the clip decreases, the number of cached segments of the clip should be decreased.

One simple approach to deal with the rank change of a media clip is to redistribute the entire clip and rebuild a new cache layout. However, as discussed above, this approach is not without drawbacks.

The problems associated with the simple redistribution model are overcome with the novel caching method of the present invention which utilizes a combination of lazy caching and caching tokens. When an origin server detects a rank change, the origin server distributes the rank change information to the proxy servers in the network to build a new cache layout to reflect the rank change. However, a novel feature of the caching method of the present invention is that the new cache layout is not immediately constructed in response to the rank change of the media clip, rather, in accordance with the lazy caching approach, the new cache layout is deferred or postponed until client requests are received at the respective proxy servers for the media clip whose rank or popularity is changed. It will be shown that the new cache layout evolves incrementally with each client request.

ILLUSTRATIVE EXAMPLES

The following example will further clarify the caching method of the present invention which is based on the principles of lazy caching and token exchange.

FIGS. 2a–2e illustrate a series of client requests where each request contributes to the eventual construction of the new cache layout for a particular segment of a media clip in response to a rank change for the media clip using lazy caching and token exchange. In particular, FIGS. 2a–2e illustrate the situation where the rank change for a media clip increases. That is, the popularity of the media clip has become more popular over time.

As discussed above, if the rank of a media clip is changed, the change should be reflected in the entire caching system by changing or updating the cache layout. Assuming that a media clip has already been distributed among the proxy servers which make up the distributed cache, when a rank change is detected at an origin server, the origin server must distribute the updated rank information to each proxy in the distributed cache. The distributed rank information allows each proxy server to re-calculate or update the segment caching probabilities for the media clip whose rank is changed to determine whether to store or not store the individual segments of the clip. In the case where a clip's popularity or rank is detected to be increased, the increased popularity should be reflected by increasing the number of segments of the clip to be cached amongst the proxy servers. This situation is illustrated by the example shown by FIGS. 2a–2e. Conversely, where a clip's popularity is detected to be decreased, the decreased popularity should be reflected by decreasing the number of segments of the clip to be cached amongst the proxy servers, as illustrated by the example shown by FIGS. 3a–3d.

Media Clip Rank Increase

In the case where a clip's popularity is increased, the system reflects the increased popularity of the clip by having more NDPS's store the segments of the clip. This process of dynamically adjusting to the increased popularity is carried out by the present invention by a method of token exchange. The overall objective of token exchange is to minimize the amount of data transfer in performing the adjustment. In so doing, a new cache layout is developed from an old cache layout.

FIGS. 2a–2e illustrate how a new cache layout develops from an old cache layout using lazy caching and token exchange for one segment of a media clip, e.g. segment S, in response to a rank increase for the media clip.

FIG. 2a illustrates the old cache layout prior to the rank change. FIGS. 2b–2d represent transitional stages in the construction of the new cache layout, and FIG. 2e illustrates the new cache layout. Shaded circles represents those proxy servers that caches segment S at each stage of the transition from the old to the new cache layout.

Referring to FIG. 2a, it is shown that, prior to the rank change, proxy servers I and J both cache segment S of media clip M and proxy servers A–D do not cache segment S. Upon receiving rank change information from an origin server, each proxy server independently determines whether or not it should cache each segment of the media clip in accordance with the rank change information. As shown in FIG. 2a, proxy servers I and J have determined not to cache segment S of media clip M in accordance with the rank change information, as indicated by I(0) and J(0). Proxy servers A–D, however, have determined to cache segment S in accordance with the rank change, as indicated by the token indicators, i.e., A(1), B(1), C(1) and D(1). It is important to note that in spite of the rank change and the subsequent determinations made by each proxy server to store or not store the individual segments of the media clip at each proxy server, no cache layout change actually occurs until client requests are received for the segment, as will be described.

Referring now to FIG. 2b, which illustrates a first transition stage from the old to the new cache layout, a first request for segment S arrives at proxy server A subsequent to the rank change. Upon receiving the segment request from the client at proxy server A, proxy server A in turn sends a segment request packet (SREQ) to proxy server I. The SREQ contains at a minimum the following fields; a first field defining the requested clip; a second field defining the requested segment of the requested clip; a third field defining a token bit which is set to 1. In so doing, proxy server A is said to have initiated a token exchange with proxy server I. It is noted that each proxy server maintains a list detailing which proxy servers currently store each segment of a media clip. In the present example, proxy server A determines from its local list that proxy server I currently stores the requested segment S. The means by which a requesting proxy server locates a remote proxy server which stores the requested segment can include, for example, selecting the first proxy server from the local list, selecting a proxy server at random, or selecting a proxy having a minimum load. Other means of selecting a remote proxy server, not explicitly recited, are within the scope of the invention.

Upon receiving the SREQ at proxy server I with token bit set to 1, a check is made as to whether proxy server I currently possesses a token for requested segment S. In the example, proxy server I does possess segment S but does not possess the token for segment S, as indicated by I(0) and the shaded circle associated with I(0) in FIGS. 2a and 2b. In this case, proxy server I grabs the token bit sent from proxy server A and sets the token bit for the requested segment to 1 in its local cache, as shown in FIG. 2b, i.e., I(1). In addition, proxy server I sends a segment reply packet (SREP) to proxy server A with at least the following fields: a first field defining the requested clip; a second field defining the requested segment of the requested clip; a third field defining a token bit which is set to 0. It is noted that the token bit is set to zero thus indicating it has exchanged the token bit from proxy server A for the segment.

Upon receiving the SREP with token bit cleared at proxy server A, proxy server A is effectively informed that the token bit exchange initiated with proxy server I was successful. Proxy server A's release of the token bit to proxy server I is indicated in FIG. 2b as A(0). At this point a successful cycle of token exchange has occurred.

In general, the requesting proxy server, e.g., proxy server A, will check whether the issued SREQ has been accepted by the remote proxy server, e.g., proxy server I. If the remote proxy server accepts the SREQ request, the acceptance will be acknowledged by the remote proxy server returning the SREP with token bit set to 0, as described above. In addition to accepting the token, the remote proxy server sends the requested segment to the requesting client.

It is noted that it is the option of the remote proxy server to accept or reject the token offered by the requesting server. It is further noted that if the remote proxy server already has a token for the requested segment it cannot accept another token for the same segment. This is true because having the segment and the associated token for the segment gives the proxy server the right to retain the segment in the new cache layout. Otherwise, in accordance with the method of the present invention, having the segment without the associated token does not give the proxy server the right to retain the segment. However, the proxy server may retain the segment until such time as cache space is needed at the proxy server. When this occurs, the segment may be replaced as any other segment as needed.

Referring again to the illustrative example, and in particular to FIG. 2c, a second request arrives. In this case proxy server D and proxy server J perform a successful token exchange similar to that described above with respect to proxy servers A and I. In a similar manner, proxy server D relinquishes its token to proxy server J in exchange for the requested segment. Proxy server J now holds the segment and the token thereby giving proxy server J the right to retain the segment in accordance with the new cache layout.

Referring now to FIG. 2d, a third request arrives at proxy server B. In response to the request, proxy server B attempts a token exchange with proxy server I. However, at this point proxy server I already has a token for the segment and therefore refuses the token exchange with proxy server B. Proxy server I does, however, return the requested segment to proxy server B with the token bit set to indicate to proxy server B of the refused token exchange.

Referring now to FIG. 2e, a fourth request arrives at proxy server C. In response to the request, proxy server C attempts a token exchange with proxy server J. However, at this point proxy server I already has a token for the segment and therefore refuses the token exchange with proxy server C. Proxy server J does, however, return the requested segment to proxy server C with the token bit set to indicate to proxy server C of the refused token exchange.

Media Clip Rank Decrease

FIGS. 3a–3d illustrate how a new cache layout develops from an old cache layout using lazy caching and token exchange for one segment, e.g., segment S of a media clip M, in response to a rank decrease change for the media clip M. In this case, the number of proxy servers that cache the segment should be decreased by the rank change.

Figure 3A:
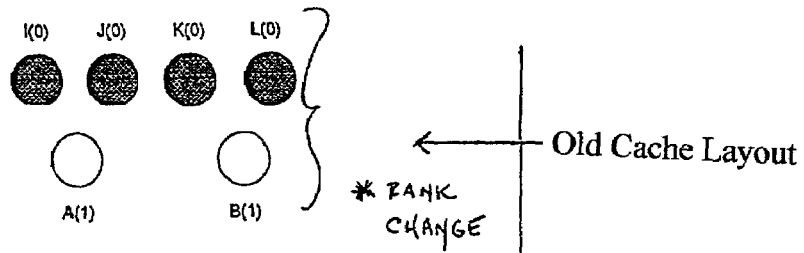
FIGS. 3a–3d illustrate an example of the caching method of the present invention in the case where a media clips' rank change is decreased.
Figure 3B:
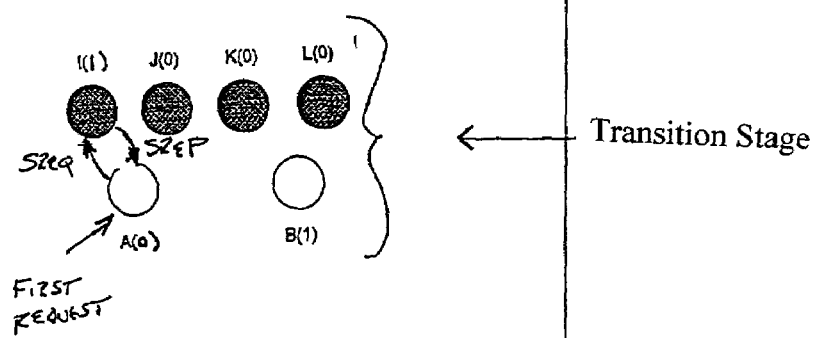
Figure 3C:
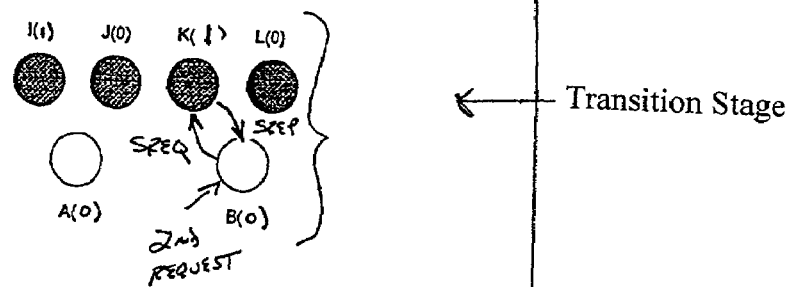

FIG. 3a illustrates the old cache layout prior to the rank change. FIGS. 3b–3c represent transitional stages in the construction of the new cache layout, which is shown complete at FIG. 3d.

Referring first to FIG. 3a, it is shown that, prior to the rank change, proxy servers I, J, K and L all cache segment S of media clip M, as illustrated by the shaded circles, and proxy servers A and B do not cache segment S. Upon receiving the rank change information, each proxy server independently determines whether or not to cache each segment of the media clip M. As shown in FIG. 3a, proxy servers I–L have determined not to cache segment S of media clip M in accordance with the rank change information, as indicated by the token indicators, i.e., I(0), J(0), K(0) and L(0). Proxy servers A and B, however, have determined that segment S should be cached in accordance with the rank change, as indicated by their respective token indicators, A(1) and B(1). It is important to note that each proxy server receives rank change information for the segment in question and makes a determination to store or not store the individual segments of the media clip, however, no cache layout changes actually take place until client requests are received for the segment, as will be described and illustrated by FIGS. 3b–d.

Referring now to FIG. 3b, which illustrates a first transition stage from the old to the new cache layout, a first request for segment S arrives at proxy server A subsequent to receiving the rank change. In response to proxy server A receiving a request for segment S, proxy server A sends a segment request packet (SREQ) with token bit set to 1 to proxy server I in an attempt to locate segment S. In so doing, proxy server A is said to have initiated a token exchange with proxy server I. Upon receiving the SREQ from proxy server A with token bit set to 1 at proxy server I, a check is made as to whether proxy server I currently possesses a token for the requested segment, segment S. In the example, proxy server I possesses segment S (the shaded circle) but does not possess the token for segment S, as indicated by I(0). In this case, proxy server I grabs the token bit sent from proxy server A and sets the token bit for segment S to 1 in its local cache, as shown in FIG. 3b, i.e., I(1). It is noted that the token bit for segment S at proxy server I transitions from I(0) to I(1). Proxy server I now holds the segment and the token thereby giving proxy server I the right to retain the segment in accordance with the current ranking.

At this point proxy server I performs two functions. First, proxy server I sends a SREP message back to proxy server A with the token bit cleared thus indicating that a token bit exchange has occurred between proxy servers I and A. Second, proxy server I sends the requested segment directly to the client to service the client request for segment S. At proxy server A, upon receiving the reply message, SREP with token bit cleared, proxy server A is effectively informed that a token bit exchange has been successfully completed with proxy server I. Proxy server A's release of the token bit to proxy server I is indicated in FIG. 3b as A(0).

Referring again to the illustrative example, and in particular to FIG. 3c, a second request arrives. In this case proxy server B and proxy server K perform a successful token exchange similar to that described above with respect to proxy servers A and I in FIG. 3b. In a similar manner, proxy server B relinquishes its token to proxy server K in exchange for the requested segment. Proxy server K now holds the segment and the token thereby giving proxy server K the right to retain the segment in accordance with the current ranking.

Figure 3D:
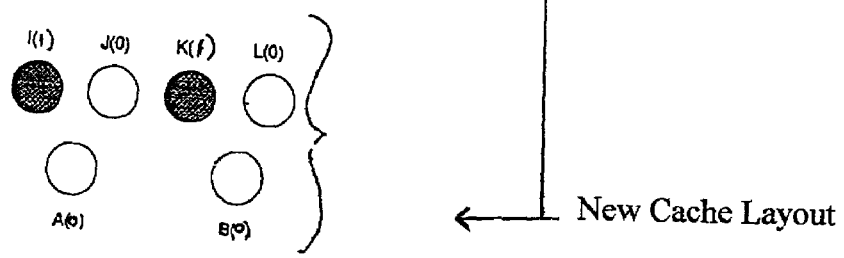

Referring now to FIG. 3d, lazy caching is described. In general, lazy caching describes a method whereby segments are removed at each proxy at a point in time at which additional cache space is required. In other words, referring to FIG. 3d, in accordance with the current ranking, segment S is not required to be stored at proxy servers J and L, respectively. However, those segments will not be removed until cache space is needed at those proxy servers. FIG. 3d describes a situation where cache space is required at proxy server J and L. In this case, segment S will be removed to satisfy the demand for cache space.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. In a network that includes at least one origin server and a plurality of network distributed proxy servers (NDPS) in communication with said at least one origin server, each NDPS including an associated cache, a method for constructing a revised cache layout of a media clip at each NDPS in accordance with a lazy caching approach and token exchange, the method comprising the steps of:

(a) receiving rank change information for said media clip from the origin server at said each NDPS;

(b) determining a revised cache layout responsive to the rank change information at said each NDPS;

(c) receiving a client request for at least one segment of said media clip at one of said each NDPS;

(d) returning said at least one requested segment from a cache associated with the one of said each NDPS in the case where a requested segment is stored therein; and (e) otherwise, initiating a token exchange with another NDPS that stores the requested segment, wherein the step of initiating a token exchange with another NDPS that caches the requested segment comprises sending a token from said one of said each NDPS to said another NDPS, wherein said token is adapted for:

retaining said at least one segment of said media clip in said revised cache layout if said another NDPS possesses a local token for said at least one segment of said media clip; and replacing said at least one segment of said media clip with at least one other segment of at least one other media clip if said another NDPS does not possess said local token for said at least one segment of said media clip.

2. The method of claim 1, wherein the step of determining a revised cache layout responsive to the rank change information, further comprises the step of determining whether to cache or discard each of a plurality of segments of said media clip using said rank change information.

3. The method of claim 2, wherein the step of determining whether to cache or discard each of a plurality of segments of said media clip using said rank change information, further comprises the step of re-computing a caching probability for each of said plurality of segments of said media clip and caching those segments whose computed probability is computed to be above a predetermined threshold value and not storing those segments whose computed probability is computed to be below said predetermined threshold value.

4. The method of claim 1, wherein the step of receiving rank change information for said media clip from the origin server, further includes the step of periodically collecting said rank change information at the origin server.

5. The method of claim 4, wherein the step of receiving said rank change information from the origin server, further includes the steps of:

(a) maintaining a local hit count for said media clip at each respective NDPS;

(b) periodically reporting the local hit count from each respective NDPS to the origin server;

(c) combining the local hit counts reported by each respective NDPS at the origin server to determine whether a rank change for said media clip has occurred; and (d) reporting said rank change from said origin server to each respective NDPS.

6. The method of claim 5, wherein the local hit count is a measure of a local preference of the media clip.

7. In a network that includes at least one origin server and a plurality of network distributed proxy servers (NDPS) in communication with said at least one origin server, each NDPS including an associated cache, a method for constructing a revised cache layout of a media clip at each NDPS in accordance with a lazy caching approach and token exchange, the method comprising the steps of:

(a) receiving rank change information for said media clip from the origin server at said each NDPS;

(b) determining a revised cache layout responsive to the rank change information at said each NDPS;

(c) receiving a client request for at least one segment of said media clip at one of said each NDPS;

(d) returning said at least one requested segment from a cache associated with the one of said each NDPS in the case where a requested segment is stored therein; and (e) otherwise, initiating a token exchange with another NDPS that stores the requested segment, wherein the step of initiating a token exchange with another NDPS that caches the requested segment further comprises the steps of:

(i) sending a segment request packet (SREQ) from said one of said each NDPS to said another NDPS with an associated token bit set to one for said requested segment;

(ii) determining at said another NDPS whether a token associated with said requested segment is set or not set;

(iii) rejecting said token exchange by said another NDPS in the case where it is determined that said token is set at said another NDPS; and (iv) accepting said token exchange in the case where it is determined that said token is not set as said another NDPS.

8. The method of claim 7, wherein step (d) further comprises the steps of:

1 setting said token associated with said requested segment to one at said another NDPS;

2 sending a segment reply message (SREP) with an associated token set to zero to said one of each of said proxy server, and 3 returning the requested segment to the client.

9. The method of claim 7, wherein step (d) precludes said another NDPS from accepting future token exchanges until a new rank change occurs.

10. A system for constructing a revised cache layout of a media clip at a plurality of network distributed proxy servers (NDPS) in accordance with a lazy caching approach and token exchange, the system including an origin server in communication with said plurality of NDPS's, each NDPS including an associated cache, the system including:

means for receiving rank change information for said media clip from the origin server;

means for determining a revised cache layout responsive to the rank change information;

means for receiving a client request for at least one segment of said media clip;

means for returning said at least one requested segment from an NDPS cache from among said plurality of NDPS's; and means for initiating a token exchange with another NDPS which stores the requested segment, wherein said means for initiating a token exchange with another NDPS that caches the requested segment comprises means for sending a token from said one of said each NDPS to said another NDPS, wherein said token is adapted for:

retaining said at least one segment of said media clip in said revised cache layout if said another NDPS possesses a local token for said at least one segment of said media clip; and replacing said at least one segment of said media clip with at least one other segment of at least one other media clip if said another NDPS does not possess said local token for said at least one segment of said media clip.

* * * * *